United States Patent
Lee et al.

(10) Patent No.: US 8,711,756 B2
(45) Date of Patent: Apr. 29, 2014

(54) EFFICIENT RELAY AUTOMATIC REPEAT REQUEST PROCEDURE IN BROADBAND WIRELESS ACCESS SYSTEM

(75) Inventors: Eun Jong Lee, Anyang-si (KR); Young Soo Yuk, Anyang-si (KR); Yong Ho Kim, Anyang-si (KR); Ki Seon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 221 days.

(21) Appl. No.: 13/395,421

(22) PCT Filed: Sep. 13, 2010

(86) PCT No.: PCT/KR2010/006220
§ 371 (c)(1),
(2), (4) Date: Mar. 9, 2012

(87) PCT Pub. No.: WO2011/031109
PCT Pub. Date: Mar. 17, 2011

(65) Prior Publication Data
US 2012/0170509 A1    Jul. 5, 2012

Related U.S. Application Data

(60) Provisional application No. 61/241,405, filed on Sep. 11, 2009.

(30) Foreign Application Priority Data

Aug. 24, 2010   (KR) .................. 10-2010-0081904

(51) Int. Cl.
*H04B 7/14*   (2006.01)
*H04W 4/00*   (2009.01)
*H04J 1/00*   (2006.01)
*H04L 12/28*   (2006.01)
*H04B 3/36*   (2006.01)

(52) U.S. Cl.
USPC ........... 370/315; 370/338; 370/343; 370/400; 455/7

(58) Field of Classification Search
USPC ......... 370/249, 310–350, 400–401, 475–482; 455/7–13.1, 422.1; 714/746, 748–758
See application file for complete search history.

(56) References Cited

U.S. PATENT DOCUMENTS 7,630,355 B2 * 12/2009 Tao et al. ............... 370/343
8,000,650 B2 *  8/2011 Chang et al. .......... 455/11.1
(Continued)

FOREIGN PATENT DOCUMENTS

WO    2007/139341    12/2007
WO    2009/088937     7/2009

OTHER PUBLICATIONS

Mitsubishi Electric Research Lab et al., "General Relay MAC PDU Format", IEEE S802.16j-07/198r1, Mar. 2007.

(Continued)

*Primary Examiner* — Tri H Phan
(74) *Attorney, Agent, or Firm* — Lee, Hong, Degerman, Kang & Waimey (57) ABSTRACT

The present invention relates to a broadband wireless access system including a relay station, and more particularly to an efficient procedure of Automatic Repeat Request (ARQ) operations in a relay station and an apparatus for performing the same. A method for transmitting data for at least one terminal (AMS) from a base station (ABS) to a relay station (ARS) in the broadband wireless access system according to an embodiment of the present invention comprises the steps of generating second transmission unit data using a plurality of first transmission unit data to which different relay sequence numbers are assigned; and transmitting the second transmission unit data to the relay station. The second transmission unit data can be transmitted through the same tunnel as the first transmission unit data.

20 Claims, 9 Drawing Sheets

(56) References Cited

U.S. PATENT DOCUMENTS

| | | | |
|---|---|---|---|
| 8,175,014 B2 * | 5/2012 | Terry et al. | 370/278 |
| 8,201,044 B2 * | 6/2012 | Chang et al. | 714/749 |
| 8,402,335 B2 * | 3/2013 | Doppler et al. | 714/749 |
| 2008/0117877 A1 * | 5/2008 | Min et al. | 370/331 |
| 2009/0213778 A1 * | 8/2009 | Tao et al. | 370/315 |

OTHER PUBLICATIONS

LG Electronics, "Proposed Text Related to Relay MAC PDU for the IEEE 802.16m/D1 (Relay)", IEEE 802.16 Broadband Wireless Access Working Group, IEEE C802.16m-9/1914, Aug. 2009.

* cited by examiner

ARQ Tx block states

FIG. 4

ARQ Tx block states in MR-BS

FIG. 5

Example of fragmentation and packing of relay MAC PDUs

FIG. 6

Original transmission (a)

Retransmission of relay MAC PDU #3,4,5 with rearrangement (b)

Retransmission of relay MAC PDU #3,4,5 without rearrangement (c)

EFFICIENT RELAY AUTOMATIC REPEAT REQUEST PROCEDURE IN BROADBAND WIRELESS ACCESS SYSTEM

TECHNICAL FIELD

The present invention relates to a broadband wireless access system including a relay station, and more particularly to an efficient Automatic Repeat reQuest (ARQ) operation procedure in a relay station and an apparatus for performing the same.

BACKGROUND ART

In a next generation wireless communication system, it is expected that a relay station (RS) will be widely used. The concept of the RS will be described in brief as follows.

A standardization project of a new subject entitled "a multi-hop relay" is in progress now after publication of a standard for fixed subscriber terminals, i.e., IEEE 802.16-2004, and a standard to provide mobility of subscriber terminals, i.e., IEEE 802.16e-2005, in Institute of Electrical and Electronics Engineers (IEEE) 802.16 in 2006.

In such a project which Task Group J (IEEE 802.16j) in IEEE 802.16 takes part in, from the first official conference was carried out in May, 2006, at the second conference in July, 2006, a usage model, terminology and technical requirements started to be discussed in earnest. Hereinafter, Task Group J in IEEE 802.16 will be abbreviated to "802.16j".

The concept of the relay station which will be described hereinafter may be substantially identically used in the case of a relay station considered in a 3GPP LTE-A system. Further, relay stations having the same or similar functions in various other wireless access systems may be used to have the similar concept as the relay station described in the present invention.

A Project Authorization Request (PAR) of 802.16j which is a standardization operation which will progress in the future has two objects, i.e., coverage extension and throughput enhancement.

Relay stations may be generally divided into two kinds, a transparent kind and a non-transparent kind. A transparent relay station has all operations and functions present therein, and manages terminals. On the other hand, a non-transparent relay station serves to relay all operations and functions between a macro base station and a terminal.

From the viewpoint of a terminal, the terminal treats the transparent relay station and the non-transparent relay station as one macro base station without distinction and does not cause any change of an operation, but may have a function of discriminating between a relay station and a macro base station.

A network including a relay station may include a base station (BS), the relay station (RS) and a terminal (mobile station: MS). The MS may receive a wireless signal through the RS even at the outside of a cell area of the base station. Further, a path of a high quality having a high-level adaptive modulation and coding (AMC) method of the MS at the inside of the cell area of the base station may be set through the RS. Therefore, a user may obtain an effect of increasing capacity of the overall system using the same wireless resources.

A standard which will be made by the 802.16j project has designated requirements. For example, mobile stations implemented based on the IEEE 802.16-2004 standard and the IEEE 802.16e-2005 standard should communicate with a relay station without addition of any function. Therefore, in the conventional system, the scope of application of the relay station may be restricted in the form of addition of some functions to control the relay station to the relay station and the existing base station. It is expected that the standard of the relay station will be a key issue of standardization from now on.

The relay station may be considered as a kind of subscriber terminal which performs operations of a physical layer and a medium access control layer, and may be mainly controlled by a base station but may have a designated control function as needed. In a usage model under discussion, various types of relay stations, such as a mobile relay station to provide a temporary service to a specific region and a relay station installable in a vehicle, a subway, etc. as well as a fixed relay station are considered.

Representative technical issues which will be discussed later are as follows.

1. A procedure through which a base station identifies relay stations present in the area thereof and obtains and maintains information regarding topology with the relay stations.

2. A definition of a physical transmission frame between a relay station and a mobile station having backward compatibility with the conventional IEEE 802.16 system 3. A signal procedure to provide mobility between relay stations or between a relay station and a base station.

4. A network entry procedure of a relay station into a base station and an entry procedure of a mobile station through a relay station.

Frame structures used in relay stations may include a downlink frame structure and an uplink frame structure. Here, the downlink frame structure may include a downlink (DL) access zone and a DL relay zone, and the uplink frame structure may include an uplink (UL) access zone and a UL relay zone.

If only one relay station (one hop structure) is present between a base station (ABS) and a mobile station (AMS), the downlink access zone represents a section in which the ARS transmits a data packet to the AMS or other lower relay stations, and the uplink access zone represents a section in which the AMS or other lower relay stations transmit a data packet to the corresponding ARS. Further, the ARS in the downlink relay zone may receive a data packet from the ABS, and the ARS in the uplink relay zone may transmit a data packet to the ABS.

The data packet may have the form of a medium access control protocol data unit (MAC PDU). In order to assist understanding of the MAC PDU, a protocol layer model defined in a general broadband wireless access system will be described first.

Figure 1:
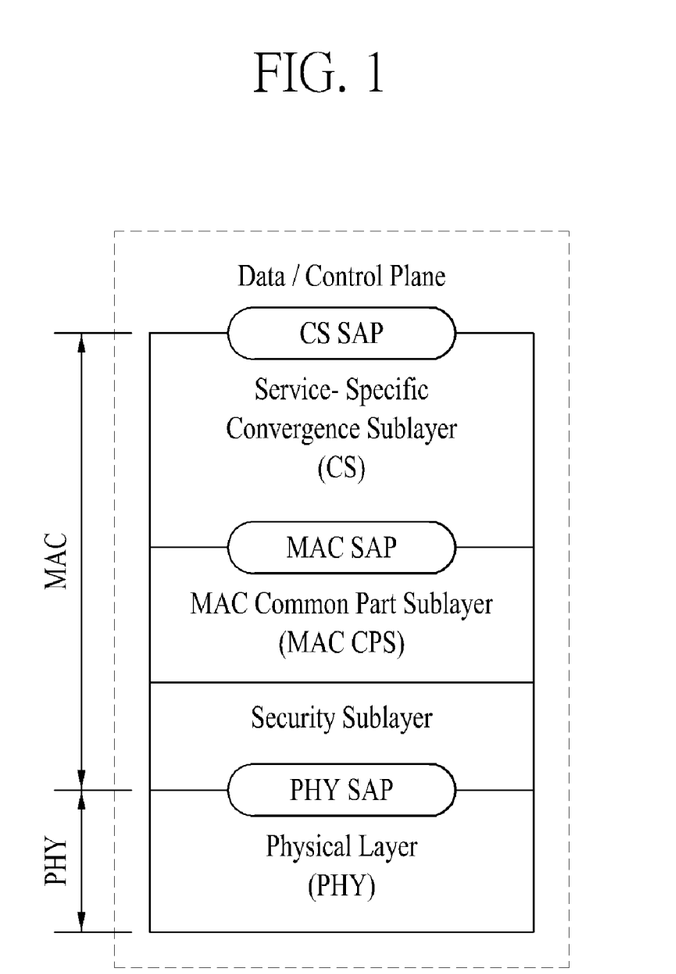
FIG. 1 is a diagram illustrating a protocol layer model defined in a generally used wireless mobile communication system based on an IEEE 802.16 system.

FIG. 1 is a diagram illustrating a protocol layer model defined in a generally used wireless mobile communication system based on an IEEE 802.16 system.

With reference to FIG. 1, a MAC layer belonging to a link layer may include three sublayers. First, a service-specific convergence sublayer (CS) may deform or map data of an external network received through a CS service access point (SAP) into MAC service data units (SDUs) of a MAC common part sublayer (CPS). Such a sublayer may include a function of discriminating SDUs of the external network and then assigning corresponding MAC service flow identifiers (SFIDs) and connection identifiers (CIDs) to the SDUs.

Next, the MAC CPS is a sublayer providing essential functions of the MAC, such as system access, bandwidth allocation, connection setting and management, and receives data classified by connection of a specific MAC from various CSs through the MAC SAP. Here, quality of service (QoS) may be applied to data transmission and scheduling through the physical layer.

Further, a security sublayer may provide authentication, security key exchange and encryption functions.

The MAC layer may be implemented as the concept of transport connection through a connection-oriented service. When a mobile station is registered in the system, a service flow may be prescribed by negotiation between the mobile station and the system. If service requirements are changed, a new connection may be set. Here, transport connection defines mapping between peer convergence processes using the MAC and the service flow, and the service flow defines QoS parameters of the MAC PDU exchanged in the corresponding connection.

The service flow on the transport connection performs an essential role in operation of the MAC protocol, and provides a mechanism for QoS management of the uplink and the downlink. Particularly, the service flows may be connected to a bandwidth allocation process.

In the general IEEE 802.16 system, a mobile station may have a universal MAC address having a length of 48 bits per wireless interface. Such an address defines the wireless interface of the mobile station, and may be used to set connection of the mobile station during an initial ranging process. Further, since the base station verifies mobile stations through different IDs of the respective mobile stations, the universal MAC address may be used as a part of the authentication process.

The respective connections may be identified by connection identifiers (CIDs) having a length of 16 bits. While initialization of a mobile station is performed, two pairs of the management connection are set between the mobile station and the base station, and three pairs including the two pairs of the management connection may be selectively used. Recently, in the IEEE 802.16m system, the CIDs may be replaced with station identifiers (STIDs) and flow identifiers (FIDs) to identify the flow. Here, the STID means an identifier of 12 bits which is allotted to a mobile station performing network (re)entry by the base station, and the FID means an identifier of 4 bits to identify the connection (the management connection or the transport connection) to a specific mobile station. An ARS STID may be applied to an advanced relay station (ARS) of an IEEE 802.16m system.

Under the above-described layer structure, a transmitting end and a receiving end may exchange data or a control message through the MAC PDUs. In order to generate such MAC PDUs, the base station or the mobile station may allow the MAC PDU to include a MAC header.

That is, the MAC PDU may include the MAC header, an extended header and a payload. The MAC PDU may include the MAC header at any time, and may selectively include the payload as needed. However, the MAC PDU does not include the extended header without the payload.

As one method through which the ARS can efficiently relay data from the ABS to a plurality of different terminals (AMSs) or data from the plurality of different AMSs to the ABS, a tunnel mode or a relay mode will be described with reference to FIG. 2.

Figure 2:
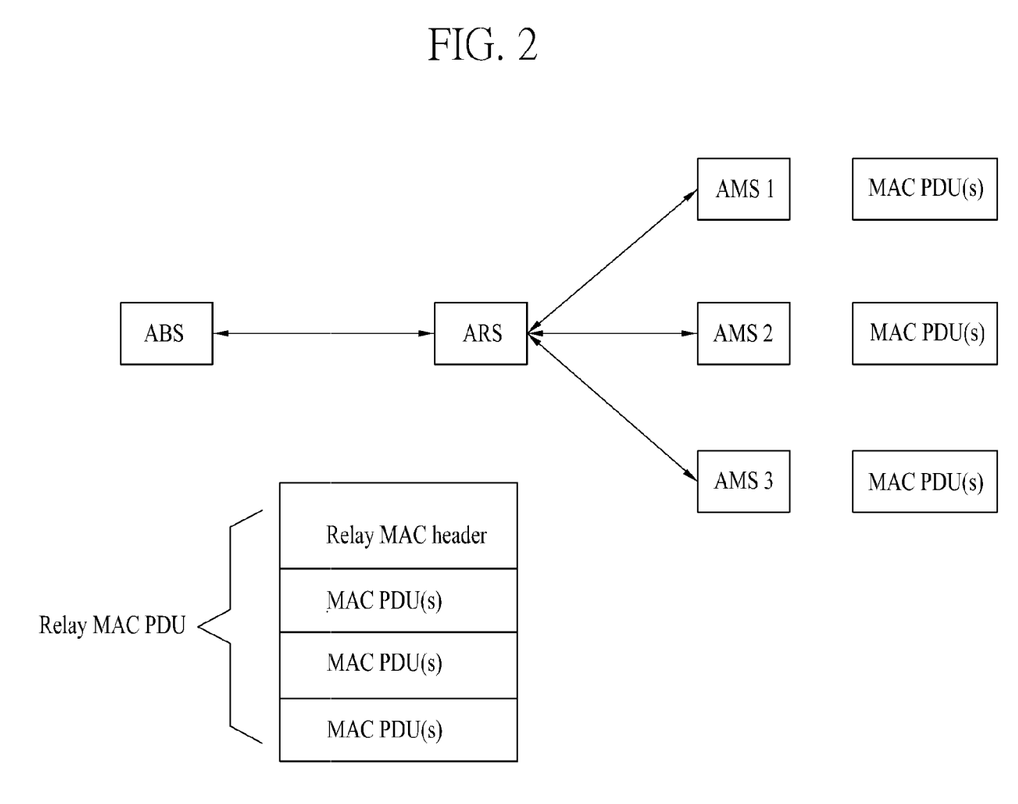
FIG. 2 is a diagram illustrating one example of a connection state between mobile stations, a base station and a relay station to which a tunnel mode is applicable.

FIG. 2 illustrates one example of a connection state between mobile stations (AMSs), a base station (ABS) and a relay station (ARS) to which the tunnel mode is applicable.

The tunnel mode refers to a mode in which the ARS forms tunnels and transmits MPDUs through the tunnels if the ARS relays data between the ABS and the plural AMSs, as shown in FIG. 2.

The ARS connected to the ABS may be uniquely discriminated in the area of the ABS by an ARS STID. If the tunnel mode is applied, the respective tunnels formed between the ABS and ARS may be discriminated from each other through different FIDs. That is, respective tunnel connections may be uniquely discriminated through combinations of the ARS STID and FIDs.

Two or more MPDUs transmitted to the plural AMSs or from the plural AMSs may be packed together with one relay MAC PDU, or may be connected to the relay MAC PDU and transmitted to a relay link. Here, which terminals the respective MPDUs are transmitted to may be determined by STIDs. For this purpose, STID information of the MPDUs may be included in the relay MAC PDU. The ARS uses the STID information included in a downlink relay MAC PDU to generate an A-MAP in an access link, and the ABS indicates which terminals the respective MAC PDUs belong to using the STID information included an uplink relay MAC PDU.

When the ARS has finished network entry into the ABS, one or more tunnels may be generated. Connection to one terminal may be mapped into one or more tunnels. In the tunnel mode, the MAC PDUs transmitted through the tunnel together with relay MAC headers including tunnel identifiers (i.e., the FIDS) may be encapsulated into the relay MAC PDU. That is, the plural MAC PDUs transmitted through one tunnel may be connected into one relay MAC PDU, and be transmitted.

Next, an ARQ technique in the relay environment will be described.

The ARQ technique refers to a technique through which a transmitting side or a receiving side detects a data error generated in a transmission line, and requests retransmission of data if the data error is detected.

Hereinafter, a general ARQ procedure will be described with reference to FIG. 3.

Figure 3:
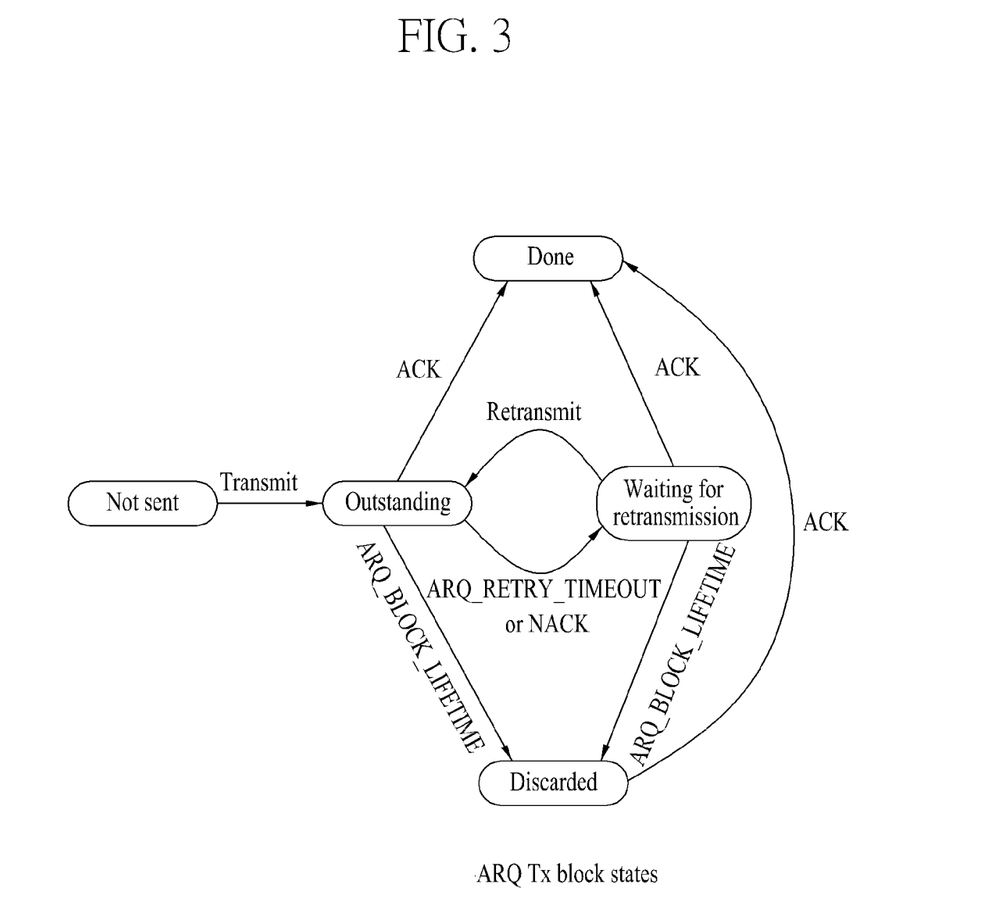
FIG. 3 is a block diagram illustrating a general ARQ operation procedure of a transmitting end.

FIG. 3 is a block diagram illustrating the general ARQ procedure of a transmitting end.

With reference to FIG. 3, a not-sent state is switched to an outstanding state according to beginning of transmission, and when an ACK is received from a receiving end in the outstanding state, the ARQ procedure is completed. If the transmitting end receives ARQ_RETRY_TIMEOUT or NACK from the receiving end in the outstanding state, retransmission is performed. Here, if retransmission succeeds (ACK is received), the ARQ procedure is completed. If a lifetime of an ARQ block (ARQ_BLOCK_LIFETIME) has expired in the outstanding state or the retransmission state, corresponding data is discarded.

In the above-described general ARQ technique, it is assumed that data transmission is carried out between one transmitting end and one receiving end. However, if an RS relays data transmission between the transmitting end and the receiving end, the ARQ procedure is modified. This will be described with reference to FIG. 4.

Figure 4:
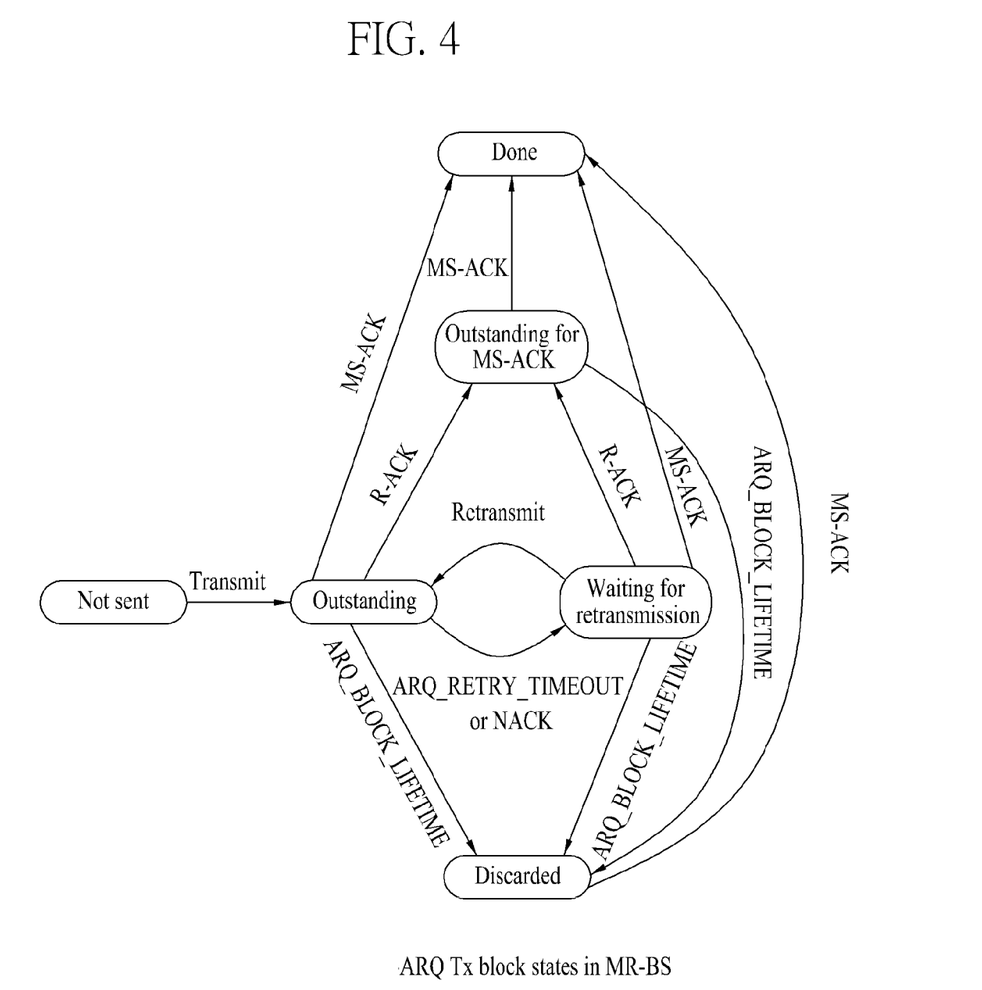
FIG. 4 is a block diagram illustrating a general ARQ operation procedure if a transmitting end is a base station in a system including a relay station.

FIG. 4 is a block diagram illustrating an ARQ procedure if a transmitting end is a base station in a system including a relay station.

The ARQ procedure of FIG. 4 is similar to the general ARQ procedure of FIG. 3, but differs from the general ARQ procedure of FIG. 3 in that the ARQ procedure of a corresponding ARQ block is completed only if ACK (MS-ACK) from a mobile station is received regardless of whether or not ACK (RS-ASK) from a relay station is received.

There are three ARQ modes which are applicable in a multi-hop relay system.

The first ARQ mode is referred to as an end-to-end ARQ mode which is performed between a BS and MS. In such a mode, the additional ARQ capability of an RS is not requested.

The second ARQ mode is referred to as a two-link ARQ mode which is performed between a MR-BS and an access RS and between an access RD and a MS. In such a mode, an ARQ operation is divided according the above-described two links.

The final ARQ mode is referred to as a hop-by-hop ARQ mode which is performed between two adjacent objects (a MS, an RS or a BS). In such a mode, an ARQ operation may be divided according to respective links.

If the hop-by-hop ARQ mode or the two-link ARQ mode is applied to the system including the RS, the RS does not relay MS-NACK but relays only MS-ACK to the BS. Thus, by intervening the RS in the ARQ procedure between the MS and the BS, the RS should delete or amend feedback information (for example, an extended header including ARQ feedback IE) generated from the MS. This increases complexity of the RS, thus lowering efficiency.

DISCLOSURE

Technical Problem

If the hop-by-hop ARQ mode or the two-link ARQ mode is applied in the system including the RS, the RS does not relay MS-NACK but relays only MS-ACK to the BS. Thus, by intervening the RS in the ARQ procedure between the MS and the BS, the RS should delete or amend feedback information (for example, an extended header including ARQ feedback IE) generated from the MS. This increases complexity of the RS, thus lowering efficiency. Further, if the tunnel mode is applied to data transmission between the RS and BS, delay due to fragmentation and packing of MAC PDUs may occur.

An object of the present invention is to provide an efficient Automatic Repeat reQuest (ARQ) operation method in a system including a relay station.

The technical problems solved by the present invention are not limited to the above technical problems and those skilled in the art may understand other technical problems from the following description.

Technical Solution

The object of the present invention can be achieved by providing a data transmission method through which a base station (ABS) transmits data regarding at least one mobile station (AMS) to a relay station (ARS) in a broadband wireless access system, including generating second transmission unit data using a plurality of first transmission unit data to which different relay sequence numbers are respectively assigned, and transmitting the second transmission unit data to the ARS, wherein the second transmission unit data is transmitted through the same tunnel as the first transmission unit data.

The relay sequence numbers may be sequence numbers to identify the first transmission unit data in an automatic repeat request (ARQ) procedure.

Each of extended headers of the second transmission unit data may include the relay sequence number of any one of the plurality of first transmission unit data included in the second transmission unit data.

The relay sequence number included in the extended header may be the foremost sequence number from among the relay sequence numbers of the plurality of first transmission unit data included in the second transmission unit data.

The data transmission method may further include receiving negative acknowledgement feedback (MS-NACK) indicating a reception error of specific first transmission unit data from any one of the at least one AMS, and directing the relay station to retransmit the specific first transmission unit data using the relay sequence number of the specific first transmission unit data.

The first transmission unit data may be medium access control protocol data units (MAC PDUs), and the second transmission unit data may be relay MAC PDUs.

In order to solve the above problems, a data relay method through which a relay station relays data regarding at least one mobile station (AMS) in a broadband wireless access system including the relay station, includes receiving at least one first unit data from a first station, generating at least one third unit data using second unit data respectively included in the at least one first unit data, and transmitting the at least one third unit data to a second station, wherein the second unit data includes a plurality of fourth unit data to which different relay sequence numbers are respectively assigned.

The relay sequence numbers may be sequence numbers to identify the fourth unit data in an automatic repeat request (ARQ) procedure.

Each of extended headers of the first unit data and the third unit data may include the relay sequence number of any one of the at least one fourth unit data respectively included therein.

The relay sequence number included in each of the extended headers may be the foremost sequence number from among the relay sequence numbers of the at least one fourth unit data included in the first unit data or the third unit data.

The data relay method may further include receiving negative acknowledgement feedback (MS-NACK) indicating a reception error of specific fourth unit data from any one of the at least one AMS from the second station, and transmitting the MS-NACK to the first station.

The data relay method may further include receiving a request for retransmission of the specific fourth unit data from the first station, and transmitting the request to the second station, and the request may be performed through the relay sequence number of the specific fourth unit data.

The first unit data and the third unit data may be relay medium access control protocol data units (MAC PDUs), the second unit data may be tunnel data units (TDUs), and the fourth unit data may be MAC PDUs.

The first station may be a base station or an upper relay station, and the second station may be a lower relay station of the relay station.

In order to solve the above problems, a relay station (ARS) system which relays data exchanged between a base station (ABS) and at least one mobile station (AMS) in a broadband wireless access system, includes a processor, and a wireless communication (RF) module to transmit and receive a wireless signal with the outside under control of the processor, wherein the processor generates at least one third unit data using second unit data respectively included in at least one first unit data received from a first station, and transmits the at least one third unit data to a second station, and the second unit data includes a plurality of fourth unit data to which different relay sequence numbers are respectively assigned.

The relay sequence numbers may be sequence numbers to identify the fourth unit data in an automatic repeat request (ARQ) procedure.

Each of extended headers of the first unit data and the third unit data may include the relay sequence number of any one from among the at least one fourth unit data respectively included therein.

When the processor receives negative acknowledgement feedback (MS-NACK) indicating a reception error of specific fourth unit data from any one of the at least one AMS from the second station, the processor may transmit the MS-NACK to the first station.

When the processor receives a request for retransmission of the specific fourth unit data from the first station, the processor may transmit the request to the second station, and the request may be performed through the relay sequence number of the specific fourth unit data.

The first unit data and the third unit data may be relay medium access control protocol data units (MAC PDUs), the second unit data may be tunnel data units (TDUs), the fourth unit data may be MAC PDUs, the first station may be a base station or an upper relay station, and the second station may be a lower relay station of the relay station.

Advantageous Effects

According to the embodiments of the present invention, the following effects are obtained.

First, a relay station transmits MS-NACK to a base station as it is, thus being more efficiently operated.

Second, MAC PDUs may be identified, and thus unnecessary delay due to fragmentation or packing during a relay process may be reduced.

The effects of the present invention are not limited to the above-described effects and other effects which are not described herein will become apparent to those skilled in the art from the following description.

BEST MODE

The present invention relates to a wireless access system. Hereinafter, the embodiments of the present invention disclose an ARQ operation procedure which may be used in data exchange of plural mobile stations between a relay station and a base station.

In the embodiments below, elements and characteristics of the present invention are combined in a designated form. The respective elements or characteristics may be selectively considered unless specified otherwise. The respective elements or characteristics may be implemented without combination with other elements or characteristics. Further, the embodiments of the present invention may be configured by combination of some elements and/or characteristics. The order of operations described in the embodiments of the present invention may be changed. Some elements or characteristics of one embodiment may be included in another embodiment, or may be replaced with corresponding elements of characteristics of another embodiment.

In the description below, the embodiments of the present invention will be described based on data transmission and reception relations between a base station and terminals. Here, the base station means a terminal node of a network performing communication directly with the terminals. In this description, a specific operation described as being performed by the base station may be performed by an upper node of the base station in certain circumstances.

That is, it will be apparent to those skilled in the art that various operations performed for communication with terminals in a network including a plurality of network nodes including a base station may be performed by the base station or network nodes other than the base station. The term 'base station (BS)' may be replaced with terms, such as fixed station, node B, eNode B (eNB), access point (AP), advanced BS (ABS), etc. Further, the term 'terminal' may be replaced with terms, such as user equipment (UE), mobile station (MS), mobile subscriber station (MSS), advanced MS (AMS), subscriber station (SS), etc.

The embodiments of the present invention can be implemented by a variety of means, for example, hardware, firmware, software, or a combination thereof.

In the case of implementing the embodiments by hardware, methods in accordance with the embodiments of the present invention can be implemented through application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of implementing the embodiments by firmware or software, methods in accordance with the embodiments of the present invention can be implemented in the form of a variety of formats, for example, modules, procedures, functions, etc, to perform the above-described functions and operations. Software codes may be stored in a memory unit so as to be driven by a processor. The memory unit may be located inside or outside of the processor, so that it can communicate with the above-described processor via a variety of well-known means.

The embodiments of the present invention may be supported by standard documents disclosed in at least one of wireless access systems, i.e., the IEEE 802 system, the 3GPP system, the 3GPP LTE system and the 3GPP2 system. That is, steps or parts of the embodiments of the present invention which are not described so as to precisely reveal the technical spirit of the present invention may be supported by the above documents. Further, all terms disclosed in the description may be described by the standard documents. Particularly, the embodiments of the present invention may be supported by one or more of standard documents of the IEEE 802.16 system, i.e., P802.16-2004, P802.16e-2005, P802.16Res2 and IEEE P802.16m documents.

Specific terms used in the following description are provided to aid in understanding of the present invention, and use of the specific terms may be changed within a scope which does not deviate from the technical spirit of the present invention.

Hereinafter, problems of an ARQ procedure generated by packing or fragmentation of a plurality of MAC PDUs in a general data transmission process through relay stations will be described with reference to FIG. 5.

Figure 5:
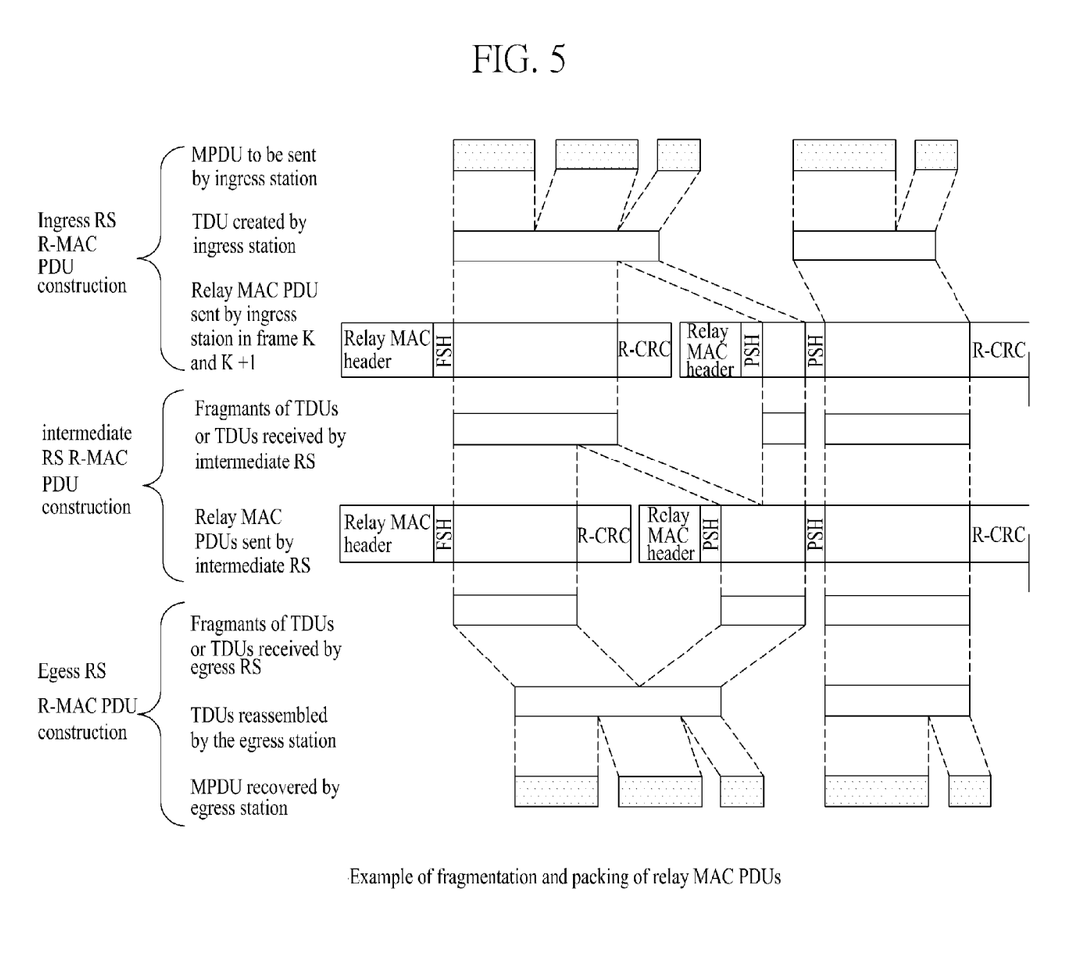
FIG. 5 is a diagram illustrating a data transmission process in a general communication system including relay stations.

FIG. 5 is a diagram illustrating one example of a data transmission process in a general communication system including relay stations. In FIG. 5, it is assumed that a plurality of MAC PDUs is transmitted via three relay stations in a multi-hop system.

In a general relay station, if a plurality of MAC PDUs of different mobile stations included in one relay MAC PDU is transmitted in the tunnel mode, a tunnel data unit (TDU) is generated prior to generation of the relay MAC PDU. Such a TDU may include one or more MAC PDUs, and the firstly generated TDU may be fragmented (using an FEH) in a relay link or be packed with another TDU (using a PEH), and then may be transmitted.

One TDU sequence number (TSN) is assigned to the firstly generated TDU, and this may be directed through the FEH or the PEH.

However, although the TDU including the plural MAC PDUs, as shown in FIG. 5, should be transmitted to different destinations (for example, mobile stations or lower relay stations), a relay node treats the TDU as one data unit and thus may cause delay of data transmission between final transmitting and receiving ends (for example, a base station and a mobile station).

That is, in such a sequence numbering method, although the relay station successfully receives some MAC PDUs included in one TDU, the relay station cannot relay the MAC PDUs to the next link. The reason for this is that fragmentation may be generated at any position within the TDU via the relay node and thus a random MAC PDU included in the TDU may be substantially transmitted through different relay MAC PDUs. Consequently, the relay station may relay the respective MAC PDUs to destination terminals only after the receiving end has successfully received all the MAC PDUs of one TDU. This causes delay of end-to-end data transmission and reception between the mobile station and the base station. Moreover, if fragmentation is generated at the middle of a specific MAC PDU during retransmission of the ARQ procedure, at worst, two relay MAC PDUs may be re-received in order to repair one MAC PDU.

Therefore, in order to increase the performance of the overall system, one embodiment of the present invention proposes that the relay station preferentially relays a MAC PDU which is successfully received. Further, the embodiment of the present invention proposes that the relay station transmits MS-NACK of the mobile station to the base station.

Hereinafter, an efficient ARQ operation procedure in a system including relay stations in accordance with one embodiment of the present invention.

Figure 6:
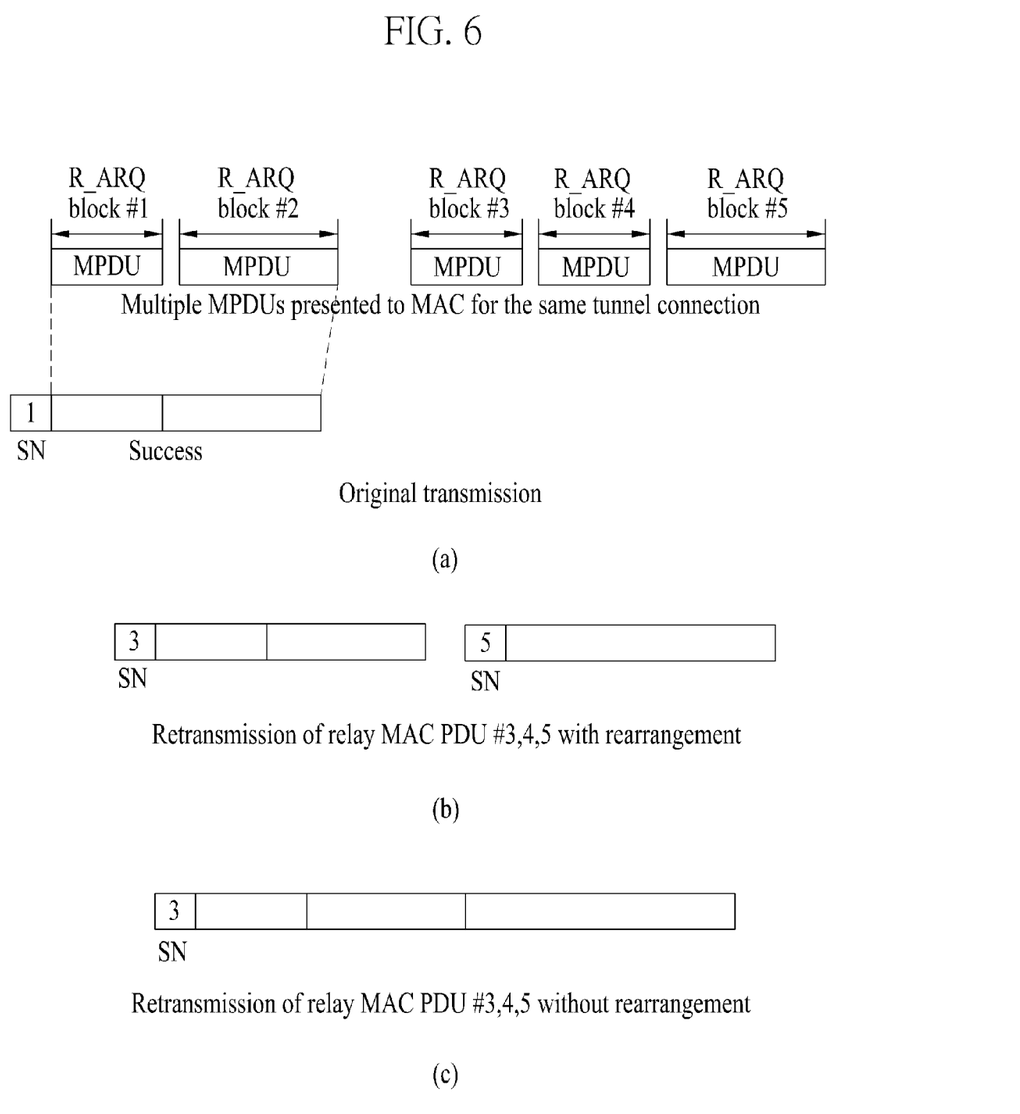
FIG. 6 is a diagram illustrating one example of a relay MAC PDU configuration in accordance with one embodiment of the present invention.

FIG. 6 is a diagram illustrating one example of a relay MAC PDU configuration in accordance with the embodiment of the present invention. In FIG. 6, it is assumed that one MAC PDU constitutes one relay ARQ block (R-ARQ block), and a plurality of MAC PDUs is transmitted through one tunnel connection.

First, with reference to FIG. 6(a), the relay MAC PDU may be generated by assigning relay sequence numbers (relay SNs) for the ARQ procedure to the respective MAC PDUs. Preferably, the relay MAC PDUs in accordance with the embodiment of the present invention may be generated in the unit of ARQ block.

In more detail, relay SNs 1 to 5 are assigned to five MAC PDUs (i.e., five R-ARQ blocks), as shown in FIG. 6(a), and when relay MAC PDUs are generated using the five MAC PDUs, the five MAC PDUs are packed or fragmented in order of the relay SNs or in reverse order. That is, two MAC PDUs corresponding to the relay SNs 1 and 2 may be packed to generate one relay MAC PDU, and three MAC PDUs corresponding to the relay SNs 3 to 5 may be packed to generate another relay MAC PDU. Since the relay MAC PDUs are generated using the plural MAC PDUs, the relay MAC PDUs are accompanied by packing extended headers (PEHs). Here, the PEHs of the respective relay MAC PDUs include the relay SNs of the MAC PDUs located at the lowermost positions (or the uppermost positions) from among the MAC PDUs included in the corresponding relay MAC PDUs.

As a result of transmission of the two relay MAC PDUs generated by the above-described process to the receiving end, the first relay MAC PDU is successfully received, but NACK may occur in the second relay MAC PDU.

In this case, when the second relay MAC PDU is retransmitted, the second MAC PDU may be fragmented into two relay MAC PDUs and then retransmitted, as shown in FIG. 6(b), or may be retransmitted in the same form as in the initial transmission, as shown in FIG. 6(c). If the second relay MAC PDU is fragmented, as shown in FIG. 6(b), the second relay MAC PDU is preferably fragmented into the MAC PDUs again, and the relay SNs may be included in the extended headers of the newly generated relay MAC PDUs according to the MAC PDU included in the newly generated relay MAC PDUs.

Figure 7:
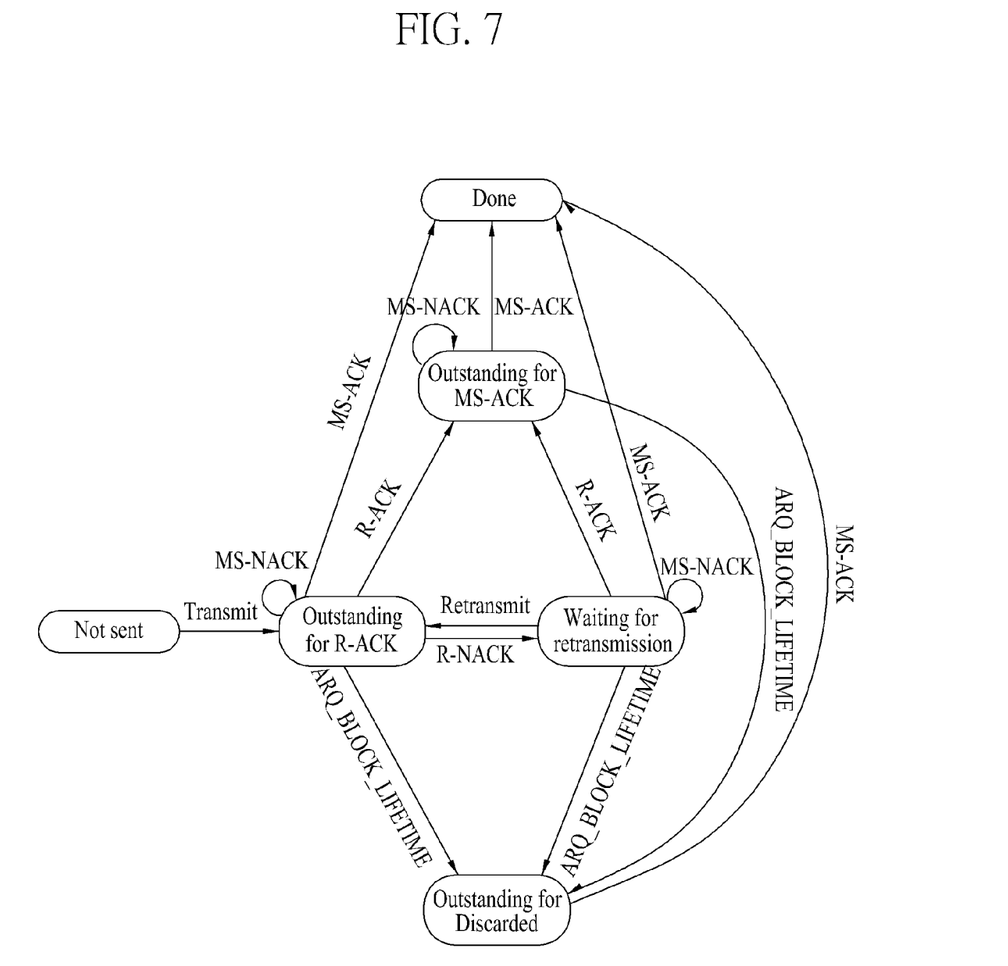
FIG. 7 is a block diagram illustrating an ARQ operation procedure of a base station in accordance with the embodiment of the present invention.

If the relay MAC PDUs having the above-described structure of FIG. 6 are applied, the ARQ procedure in the transmitting end, i.e., the base station, will take the form shown in FIG. 7.

FIG. 7 is a block diagram illustrating the ARQ operation procedure of the base station in accordance with the embodiment of the present invention.

The block diagram of FIG. 7 is similar to the block diagram of FIG. 4, but an operation by reception of MS-NACK is added to an outstanding state for R-ACK, a waiting state for R-ARQ block retransmission and an outstanding state for MS-ACK. This is caused by transmission of MS-NACK of the mobile station to the relay station in this embodiment differently from the general ARQ operation procedure. However, although the base station receives MS-NACK, the base station does not perform an additional operation.

In more detail, six states in the ARQ operation diagram of the transmitting end (i.e., the base station) in accordance with this embodiment are defined below.

Not sent: a state prior to ARQ block transmission.
Outstanding for R-ACK: a state in which relay ACK is awaited after initial transmission or retransmission of relay MAC PDUs in which ARQ blocks are encapsulated with a set of relay ARQ blocks. In such a state, MS-NACK of the ARQ block received by an ABS is disregarded.
Waiting for R-ARQ block retransmission: a state prior to retransmission of the relay MAC PDUs in the unit of ARQ block, if the R-NACK is received.
Outstanding for MS-ACK: a stand-by state to receive feedback of a mobile station, if the R-ACK is received. If the R-ACK is received but the MS-NACK is also received, in this embodiment, the base station disregards all MS-NACKs transmitted from the mobile stations. Such information may be a value referred to by the relay station. Otherwise, the base station may transmit a retransmission request control message to the relay station so as to allow the relay station to retransmit the ARQ block of the corresponding relay SN directly to the mobile station in such a state. This may be defined as the extended header (EH) of the relay MAC PDU, or may be transmitted as a standalone control message to the relay station.

ARQ block discarded: when a lifetime of the corresponding ARQ block has expired, the base station transmits a discard message to the corresponding mobile station.

Done: if the MS-ACK of the ARQ block is received, all ARQ control to the corresponding ARQ block is released.

A feedback flow between a base station, a relay station and mobile stations based on the ARQ operation procedure according to the block diagram of FIG. 7 will be described with reference to FIG. 8.

Figure 8:
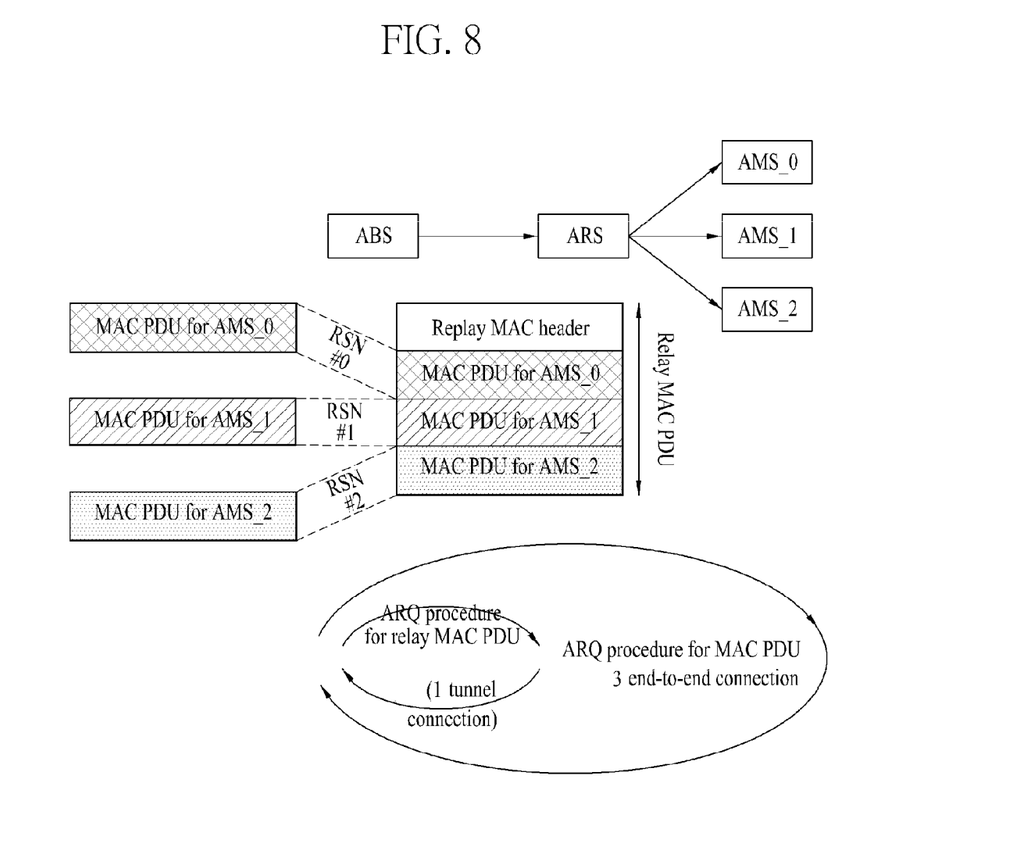
FIG. 8 is a diagram illustrating a feedback flow of relay MAC PDUs and MAC PDUs exchanged between a base station, a relay station and a plurality of mobile stations in accordance with the embodiment of the present invention.

FIG. 8 is a diagram illustrating a feedback flow of relay MAC PDUs and MAC PDUs exchanged between a base station, a relay station and a plurality of mobile stations in accordance with the embodiment of the present invention.

In FIG. 8, it is assumed that the same tunnel connection between the base station and the relay station is used when one MAC PDU (of one of the relay SN #0 to #2) is transmitted from the base station to each of three different mobile stations. In this case, the respective MAC PDUs may be transmitted from the base station to the relay station through one relay MAC PDU. The EH of the relay MAC PDU may include the relay SN #0, i.e., the foremost relay SN of the relay SNs.

Here, the ARQ procedure for the relay MAC PDU is performed between the base station and the relay station, the ARQ procedure for each of the respective MAC PDUs may be in the form of three end-to-end connections performed between the base station and the mobile stations.

Further, the relay station in accordance with this embodiment relays the MS-NACK as well as the MS-ACK to the base station. In order to perform such relay, the relay station may perform snooping of ARQ feedback information elements (IEs) of the mobile stations.

In more detail, the relay station stores ARQ blocks forwarded to the mobile stations within a buffer thereof. Preferably, buffer management is performed in each of connections divided by STIDs/FIDs. If the ARQ feedback IEs transmitted from the respective mobile stations are present, the relay station decodes the ARQ feedback IEs, flushes the ARQ block corresponding to the ACK from the buffer, and retransmits the ARQ block corresponding to the NACK.

The MAC PDUs including all ARQ feedback IEs received by the relay station are forwarded to the base station without any modification, deletion or addition. If the base station having received the ARQ feedback IEs receives the MS-ACK for the corresponding ARQ block, the base station switches the ARQ state of the corresponding block to "done".

When the lifetime of the ARQ block has expired, the base station transmits a discard message for the corresponding block. The mobile station having received the discard message transmits the ARQ feedback IE.

In general, transmission of the discard message may be performed before or after expiration of purge timeout of the mobile station. If the discard message is received prior to expiration of the purge timeout, the corresponding SN is still in an effective state in the mobile station, and the mobile station having received the discard message may transmit the ARQ feedback of the corresponding ARQ block as the ACK in response to the discard message and discard the ARQ block of the corresponding SN, simultaneously. The base station having received the ACK switches the ARQ state of the corresponding ARQ block to "done".

However, if the discard message is received after expiration of the purge timeout, the corresponding SN is treated as the ACK and is in an ineffective state in the mobile station. The ARQ feedback for the discard message at this time may be treated as the ACK for the corresponding ARQ block. In the same manner as the above case, the base station having received the ACK may switch the ARQ state of the corresponding ARQ block to "done".

The base station may receive the MS-NACK after reception of the R-ACK for a specific ARQ block. This may be generated if the relay station successfully receives the relay MAC PDU transmitted to the relay link but fails in data transmission in an access link. If the relay station is not concerned with an end-to-end ARQ procedure and if the base station receives the MS-NACK after reception of the R-ACK, the base station requests the relay station to retransmit data of the corresponding mobile relay SN to the mobile station. This may be defined as one of control messages transmitted to the relay station.

Tables 1 and 2 below represent examples of such a control message format.

Table 1 represents one example of a message format in which the base station in accordance with the embodiment of the present invention requests the relay station to retransmit data.

TABLE 1

| Name | Length (bits) | Value |
|---|---|---|
| Relay_ARQ_Retransmit_REQ_Message_Format( ){ | | |
| Control Message Type = xx | 8 | |
| FlowID | 4 | Tunnel ID |
| do{ | | |
| Relay_SN | 10 | |
| flag | 1 | |
| }while(!flag) | | |
| } | | |

With reference to Table 1, the message through which the base station requests the relay station to retransmit data to a mobile station may include a flow identifier field indicating a tunnel identifier and a field indicating a relay SN of data to be retransmitted.

TABLE 2

| Name | Length (bits) | Value |
|---|---|---|
| Relay ARQ retransmit request EH( ){ | | |
| Last | 1 | |
| EH type | TBD | |
| do{ | | |
| Relay SN | 10 | |
| flag | 1 | |
| } | | |
| } | | |

The relay station having received the message of Table 1 or the extended header of Table 2 retransmits the ARQ block corresponding to the relay SN of the corresponding FID (i.e., the tunnel ID) to the mobile station through the access link.

Mobile Station and Base Station Structure

Hereinafter, mobile stations, a relay station and a base station (FBS, MBS) in accordance with another embodiment of the present invention to perform the above-described embodiments of the present invention will be described.

The mobile station may be operated as a transmitter in an uplink, and be operated as a receiver in a downlink. Further, the base station may be operated as a receiver in the uplink, and be operated as a transmitter in the downlink. That is, each of the mobile station and the base station may include the transmitter and the receiver for transmission of information or data.

Further, as described above, the relay station may transmit a data packet, etc. to mobile stations (AMSs) or other lower relay stations in a downlink access zone, and may receive a data packet, etc. from the AMSs or other lower relay stations. Further, the relay station may receive a data packet from the base station (ABS) in the downlink access zone, and may transmit a data packet, etc. to the base station (ABS) in the uplink access zone. Therefore, the relay station may also include a transmitter and a receiver for such an operation.

Each of the transmitter and the receiver may include a processor, a module, parts and/or means for performing the embodiments of the present invention. Particularly, each of the transmitter and the receiver may include a module (mean) to encrypt a message, a module to interpret the encrypted message, an antenna to transmit and receive the message, etc. One example of such transmitting end and receiving end will be described with reference to FIG. 9.

Figure 9:
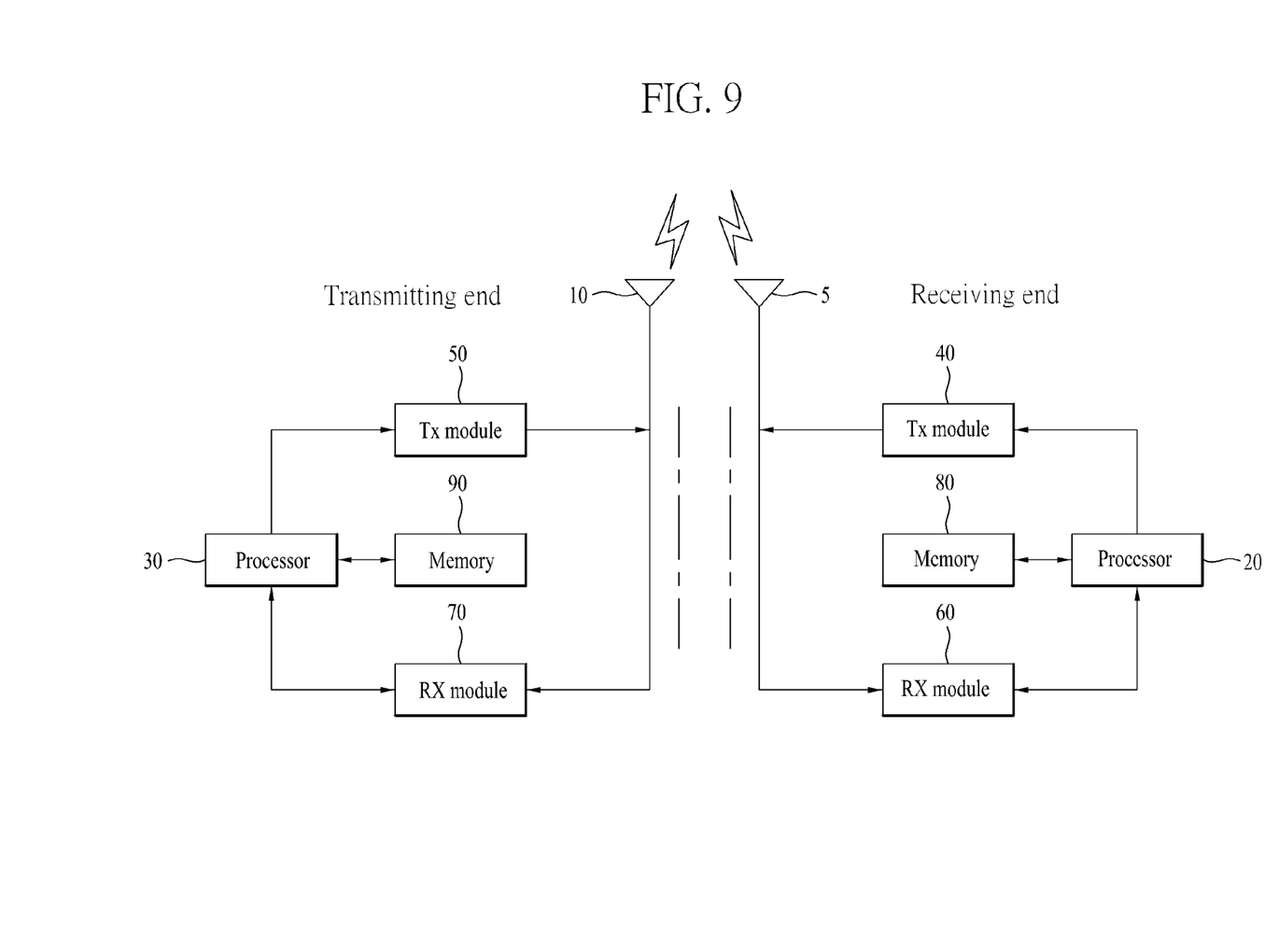
FIG. 9 is a block diagram illustrating one example of transmitting end and receiving end structures in accordance with another embodiment of the present invention.

FIG. 9 is a block diagram illustrating one example of transmitting end and receiving end structures in accordance with another embodiment of the present invention.

With reference to FIG. 9, the left side represents the structure of the transmitting end and the right side presents the structure of the receiving end. The transmitting end and the receiving end respectively include antennas 5 and 10, processors 20 and 30, transmission (Tx) modules 40 and 50, reception (Rx) modules 60 and 70, and memories 80 and 90. The respective elements may perform the corresponding functions. Here, the transmitting end may be a base station or an upper relay station, and the receiving end may be a lower relay station or a mobile station.

Hereinafter, the respective elements will be described in more detail.

The antennas 5 and 10 perform a function of transmitting signals generated by the transmission modules 40 and 50 to the outside or receiving wireless signals from the outside and transmitting the signals to the reception modules 60 and 70. If a multi-input and multi-output (MIMO) antenna function is supported, two or more antennas may be provided.

The antenna, the transmission module and the reception module may constitute a wireless communication module (RF module).

The processors 20 and 30 generally control the overall operation of a mobile terminal or a base station. For example, the processors 20 and 30 may perform a controller function to implement the above-described embodiments of the present invention, a medium access control (MAC) frame variable control function according to service characteristics and propagation environments, a handover function, an authentication and encryption function, etc.

Particularly, the processor of the base station, during transmission of MAC PDUs, transmitted from a plurality of mobile stations or forwarded to the plurality of mobile stations, to the receiving end, may generate relay MAC PDUs by encapsulation of the corresponding MAC PDUs and then transmit the relay MAC PDUs to the receiving end. Here, the extended header (PEH or FEH) of the relay MAC PDU may include a relay SN of the foremost value from among the MAC PDUs included in the relay MAC PDU.

The processor of the relay station may identify a tunnel through which the relay MAC PDU received from the base station is transmitted, and judge the length of the relay MAC PDU, through a relay GMH of the corresponding relay MAC PDU. Further, the processor of the relay station may relay the MS-ACK and MS-NACK transmitted from the mobile station to the base station.

Besides, the processors of the transmitting/receiving ends may perform the overall control operation of the operation procedure disclosed in the above-described embodiments.

The transmission modules 40 and 50 may perform designated coding and modulation of data which will be scheduled from the processors 20 and 30 and be transmitted to the outside, and then transmit the data to the antennas 5 and 10.

The reception modules 60 and 70 may restore wireless signals received from the outside through the antennas 5 and 10 to an original data form through decoding and demodulation, and then transmit the restored data to the processors 20 and 30.

The memories 80 and 90 may store a program to process and control of the processors 20 and 30, and may perform a function of temporarily storing input/output data (CRIDs, etc). Further, the memories 80 and 90 may include at least one type of storage medium from among flash memory, hard disc, multimedia card micro, and card type memories (for example, SD or XD memories), a random access memory (RAM), a static random access memory (SRAM), a read-only memory (ROM), an electrically erasable programmable read-only memory (EEPROM), a programmable read-only memory (PROM), a magnetic memory, a magnetic disc and an optical disc.

Further, the base station may perform a controller function to perform the above-described embodiments of the present invention, orthogonal frequency division multiple access (OFDMA) packet scheduling, time division duplex (TDD) packet scheduling and channel multiplexing function, a medium access control (MAC) frame variable control function according to service characteristics and propagation environments, a high-speed traffic real time control function, a handover function, an authentication and encryption function, a packet modulation and demodulation function for data transmission, a high-speed packet channel coding function and a real time modem control function, or may further include separate means, modules or parts to perform these functions.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents. Further, the non-cited claims may be combined to constitute embodiments, and new claims may be formed by amendment after application.

INDUSTRIAL APPLICABILITY

Although the above-described efficient Automatic Repeat reQuest (ARQ) operation method and relay station/base station structures in a broadband wireless access system are exemplarily described as being applied to an IEEE 802.16 system, the efficient Automatic Repeat reQuest (ARQ) operation method and relay station/base station structures may be applied to various mobile communication systems, such as 3GPP/3GPP2, in addition to IEEE 802.xx systems.

The invention claimed is:

1. A data transmission method through which a base station (ABS) transmits data regarding at least one mobile station (AMS) to a relay station (ARS) in a broadband wireless access system, comprising:
generating second transmission unit data using a plurality of first transmission unit data to which different relay sequence numbers are respectively assigned; and
transmitting the second transmission unit data to the ARS, wherein the second transmission unit data is transmitted through the same tunnel as the first transmission unit data.

2. The data transmission method according to claim 1, wherein the relay sequence numbers are sequence numbers to identify the first transmission unit data in an automatic repeat request (ARQ) procedure.

3. The data transmission method according to claim 2, wherein each of extended headers of the second transmission unit data includes the relay sequence number of any one of the plurality of first transmission unit data included in the second transmission unit data.

4. The data transmission method according to claim 3, wherein the relay sequence number included in the extended header is the foremost sequence number from among the relay sequence numbers of the plurality of first transmission unit data included in the second transmission unit data.

5. The data transmission method according to claim 2, further comprising:
receiving negative acknowledgement feedback (MS-NACK) indicating a reception error of specific first transmission unit data from any one of the at least one AMS; and
directing the relay station to retransmit the specific first transmission unit data using the relay sequence number of the specific first transmission unit data.

6. The data transmission method according to claim 1, wherein:
the first transmission unit data is medium access control protocol data units (MAC PDUs); and
the second transmission unit data is relay MAC PDUs.

7. A data relay method through which a relay station relays data regarding at least one mobile station (AMS) in a broadband wireless access system including the relay station, comprising:
receiving at least one first unit data from a first station;
generating at least one third unit data using second unit data respectively included in the at least one first unit data; and
transmitting the at least one third unit data to a second station,
wherein the second unit data includes a plurality of fourth unit data to which different relay sequence numbers are respectively assigned.

8. The data relay method according to claim 7, wherein the relay sequence numbers are sequence numbers to identify the fourth unit data in an automatic repeat request (ARQ) procedure.

9. The data relay method according to claim 8, wherein each of extended headers of the first unit data and the third unit data includes the relay sequence number of any one of the at least one fourth unit data respectively included therein.

10. The data relay method according to claim 9, wherein the relay sequence number included in each of the extended headers is the foremost sequence number from among the relay sequence numbers of the at least one fourth unit data included in the first unit data or the third unit data.

11. The data relay method according to claim 8, further comprising:
receiving negative acknowledgement feedback (MS-NACK) indicating a reception error of specific fourth unit data from any one of the at least one AMS from the second station; and
transmitting the MS-NACK to the first station.

12. The data relay method according to claim 11, further comprising:
receiving a request for retransmission of the specific fourth unit data from the first station; and
transmitting the request to the second station,
wherein the request is performed through the relay sequence number of the specific fourth unit data.

13. The data relay method according to claim 7, wherein:
the first unit data and the third unit data are relay medium access control protocol data units (MAC PDUs);
the second unit data is tunnel data units (TDUs); and
the fourth unit data is MAC PDUs.

14. The data relay method according to claim 7, wherein:
the first station is a base station or an upper relay station; and
the second station is a lower relay station of the relay station.

15. A relay station (ARS) system which relays data exchanged between a base station (ABS) and at least one mobile station (AMS) in a broadband wireless access system, comprising:
a processor; and
a wireless communication (RF) module to transmit and receive a wireless signal with the outside under control of the processor, wherein
the processor generates at least one third unit data using second unit data respectively included in at least one first unit data received from a first station, and transmits the at least one third unit data to a second station; and
the second unit data includes a plurality of fourth unit data to which different relay sequence numbers are respectively assigned.

16. The ARS system according to claim 15, wherein the relay sequence numbers are sequence numbers to identify the fourth unit data in an automatic repeat request (ARQ) procedure.

17. The ARS system according to claim 16, wherein each of extended headers of the first unit data and the third unit data includes the relay sequence number of any one of the at least one fourth unit data respectively included therein.

18. The ARS system according to claim 17, wherein, when the processor receives negative acknowledgement feedback (MS-NACK) indicating a reception error of specific fourth unit data from any one of the at least one AMS from the second station, the processor transmits the MS-NACK to the first station.

19. The ARS system according to claim 18, wherein, when the processor receives a request for retransmission of the specific fourth unit data from the first station, the processor transmits the request to the second station,
wherein the request is performed through the relay sequence number of the specific fourth unit data.

20. The ARS system according to claim 15, wherein:
the first unit data and the third unit data are relay medium access control protocol data units (MAC PDUs);
the second unit data is tunnel data units (TDUs);
the fourth unit data is MAC PDUs;
the first station is a base station or an upper relay station; and
the second station is a lower relay station of the relay station.

* * * * *